April 21, 1959     M. R. WILSON     2,882,789
DUAL RETINOSCOPE

Filed Aug. 18, 1953     6 Sheets-Sheet 1

INVENTOR.
MATHEW R. WILSON
BY
ATTORNEYS

April 21, 1959  M. R. WILSON  2,882,789
DUAL RETINOSCOPE

Filed Aug. 18, 1953  6 Sheets-Sheet 2

INVENTOR.
MATHEW R. WILSON
BY Wade Koontz AND
Orlando Z. McCoy
ATTORNEYS

April 21, 1959 M. R. WILSON 2,882,789
DUAL RETINOSCOPE

Filed Aug. 18, 1953 6 Sheets-Sheet 3

INVENTOR.
MATHEW R. WILSON
BY
Wade Koonty AND
Orlando Z. McCoy
ATTORNEYS

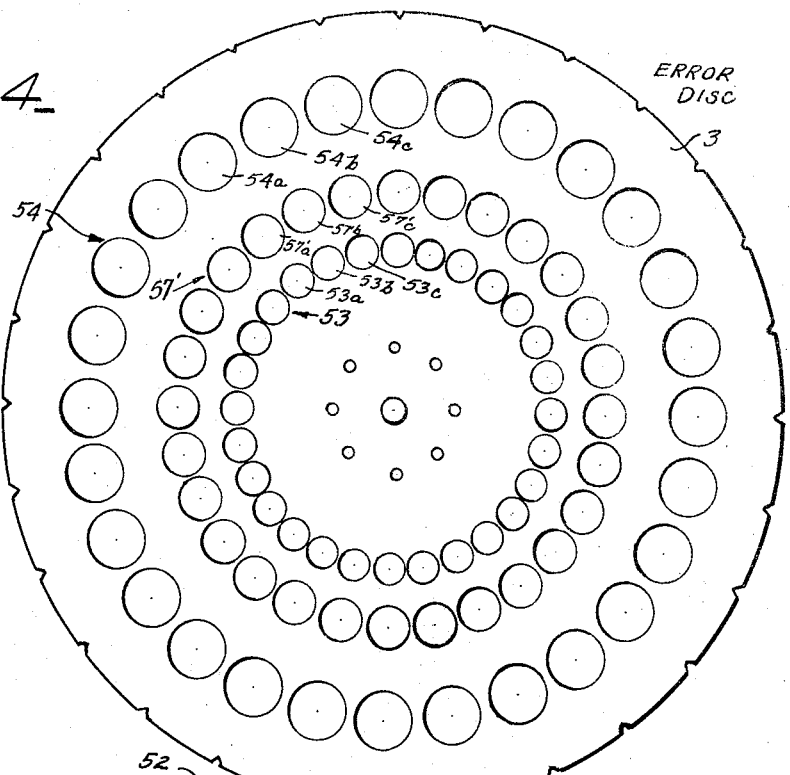
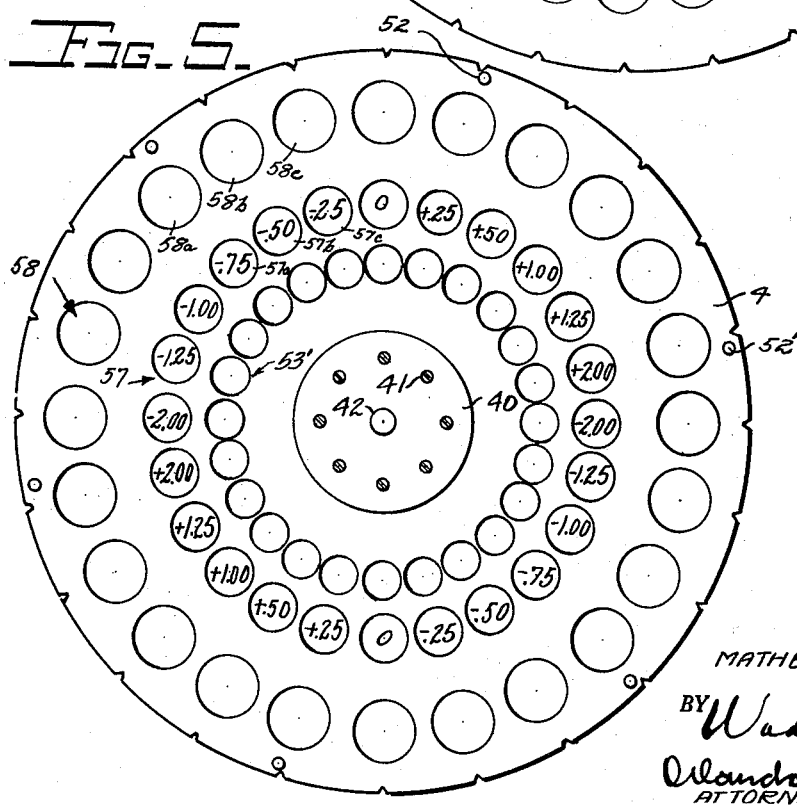

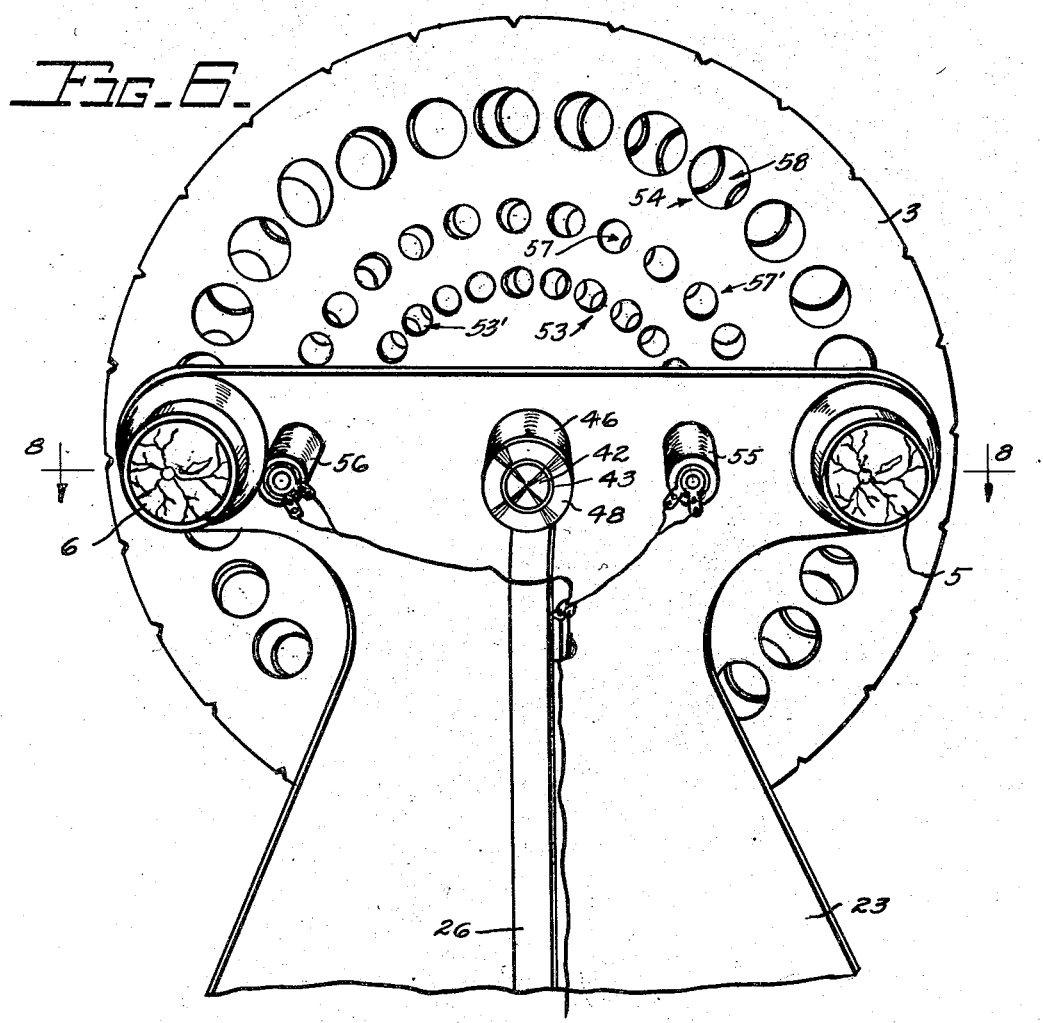

April 21, 1959
M. R. WILSON
2,882,789
DUAL RETINOSCOPE
Filed Aug. 18, 1953
6 Sheets—Sheet 6
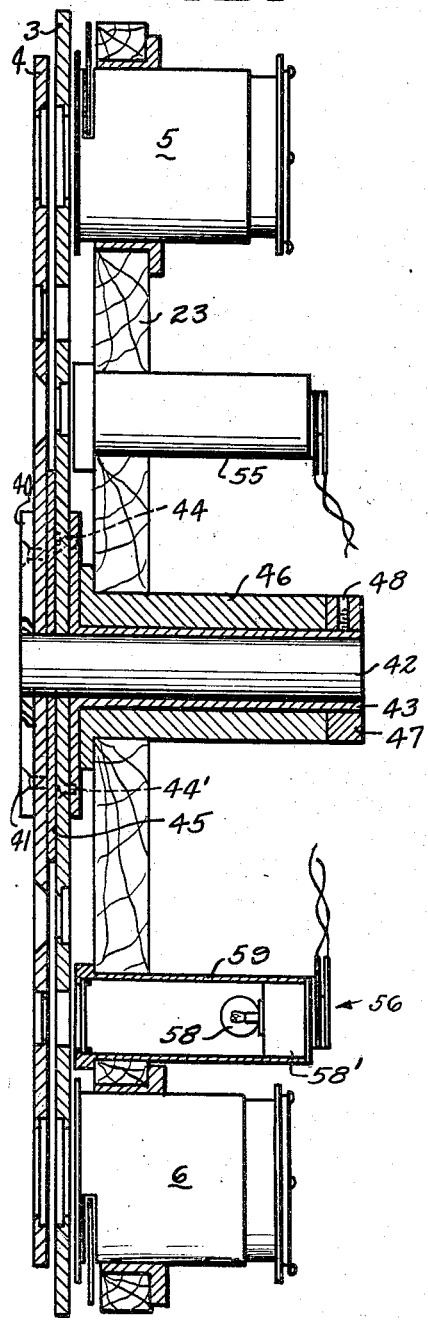
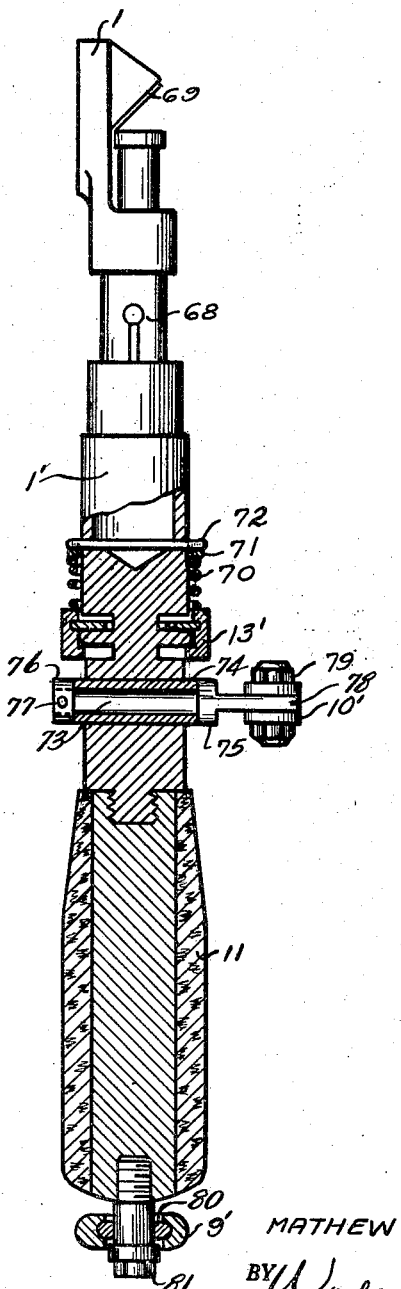
INVENTOR.
MATHEW R. WILSON
BY
ATTORNEYS

United States Patent Office 2,882,789
Patented Apr. 21, 1959

2,882,789
DUAL RETINOSCOPE

Mathew R. Wilson, Sarasota, Fla., assignor to the United States of America as represented by the Secretary of the Air Force Application August 18, 1953, Serial No. 375,083

9 Claims. (Cl. 88—22)

(Granted under Title 35, U.S. Code (1952), sec. 266)

The invention described herein may be manufactured and used by or for the Government for governmental purposes without payment to me of any royalty thereon.

This invention pertains to ophthalmic equipment and more particularly to a dual retinoscope instrument or piece of equipment for use in the study of correctable limitations of the human eye.

In the past, an instructor in retinoscopy has encountered difficulties in the presentation of his subject for study that are largely overcome by the use of the device that is disclosed herein.

The instrument that is contemplated hereby is accurate and compact and preferably is portable for its convenient use. The present invention provides an improved laboratory and classroom instrument of controlled accuracy for dependable study and for the reproduction of duplicate conditions.

An object of the present invention is to provide an accurate, dependable, adjustable and conveniently and easily used portable instrument for classroom use in the study of vision imperfections and correcting means for overcoming the imperfections in the human eye.

Another object is to provide an instrument for classroom use in courses on retinoscopy wherein an appreciable range of irregularities in vision with their corrections may be studied by means of removable and replaceable discs and lenses.

A further object is to provide a classroom instrument embodying separate commonly used retinoscope heads for both the instructor and the student with both heads under the control of the instructor so that the student becomes familiar by personal contact with one of the instruments that he is to use very frequently in practicing his profession.

Another object is to provide a classroom instrument that is well and ruggedly designed and built for long and dependable classroom use.

An illustrative device that embodies the present invention is shown in the accompanying drawings wherein:

Fig. 4 is an elevational view of the larger error disc of the device in Fig. 1;

Fig. 5 is an elevational view of the smaller error neutralizing or correcting disc in Fig. 1;

Fig. 6 is an enlarged elevational view from the rear of the discs in Fig. 1 showing the journal mounting thereof, their illumination and the mounting of a pair of schematic eyes associated therewith;

Figure 1:
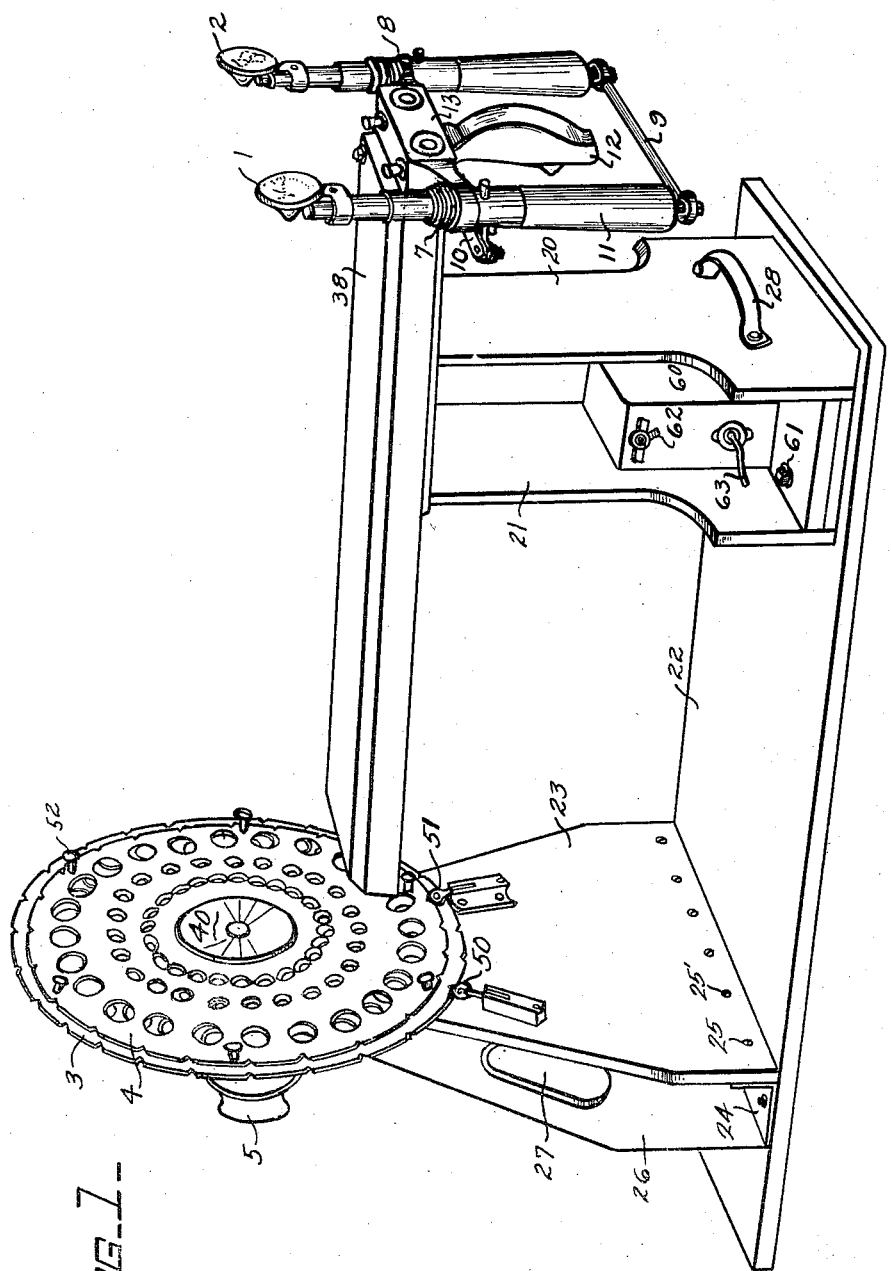
Fig. 1 is a perspective side elevational view of a dual retinoscope instrument that embodies the present invention.

Fig. 7 is an enlarged fragmentary elevational view with parts broken away and in section of the upper part of a commercially available retinoscope in a modified handle with a hand grip portion, all adapted for being mounted at the working end of the instrument to provide an operative part thereof; and Fig. 8 is an enlarged diametrical section of the two discs and their support taken substantially along the line 8—8 of Fig. 6.

The instrument shown in the accompanying drawings preferably is conveniently portable and comprises the upper portions of two commercially available retinoscopes 1 and 2 of a preferred type slipped into modified handles adapted to the device mounting, a pair of apertured lens and indicator bearing discs 3 and 4, a pair of schematic eyes 5 and 6 aligned respectively with the retinoscope heads through registering lens bearing outermost apertures in the discs and means for adjustably supporting and illuminating the working parts of the assemblage. The retinoscopes 1 and 2 are slaved with each other around spring loaded rotation joints 7 and 8 by means of a push-pull mechanical linkage 9 and a rotary mechanical linkage 10.

In use, an instructor looks through the central aperture in the head of the retinoscope 1 on the left in Fig. 1, that is in registration with and that illuminates a schematic eye 5 mounted back of the pair of discs 3 and 4. The instructor grasps the cork handle 11 of the retinoscope 1 and thereby controls and maintains conformance between the pair of retinoscopes 1 and 2 in both inclination and rotation. A student in a similar manner looks through the central aperture in the head of the retinoscope 2 at the schematic eye 6 that also is back of the discs 3 and 4 and also that is in registration with and that is illuminated by the retinoscope 2. With his left hand the instructor may rotate either or both of the discs 3 and 4 to introduce before the schematic eyes one matched pair and then two matched pairs of lenses in the outermost apertures of the discs 3 and 4.

The instructor first introduces to the student the appearance of normal vision before the schematic eyes 5 and 6 and then introduces selected optical errors. By registering pairs of lenses in the outermost rings of holes in the discs 3 and 4 the position of the larger error disc 3 introduces optical errors before the schematic eyes 5 and 6 that are neutralized by superimposing thereover pairs of lenses in the outermost ring of holes in the neutralizing or correcting disc 4.

In this manner the instructor presents to a student the appearance of a schematic eye simulating the human eye in normal vision and then conditions of abnormal or limited vision and finally the proper correction of the abnormal or limited vision by the rotary adjustment of the two discs 3 and 4.

The degree of proximity of the heads of the retinoscopes 1 and 2 to the schematic eyes 5 and 6 is established by means of a handle 12 that is secured to and that depends from a cross arm 13 extending between and supporting the retinoscopes 1 and 2. For retinoscopy a normal working distance is 66 centimeters between the retinoscope heads and the schematic eyes. The space separating the schematic eyes 5 and 6 is equal to the space between the heads of the retinoscopes 1 and 2.

Figure 2:
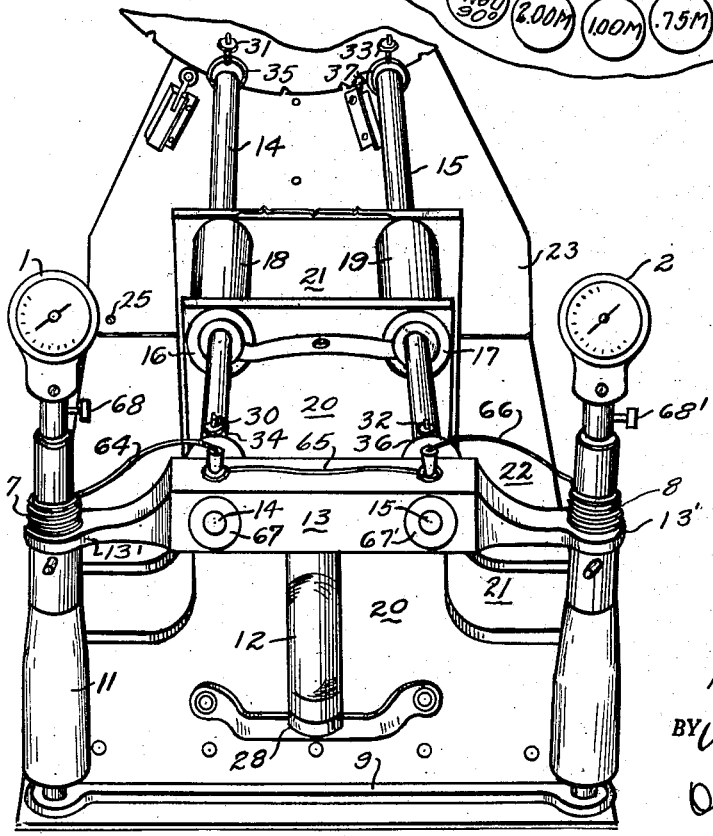
Fig. 2 is a fragmentary perspective front view from the working end of and from above the axis of the instrument shown in Fig. 1, with the guard cover thereof removed.
Figure 3:
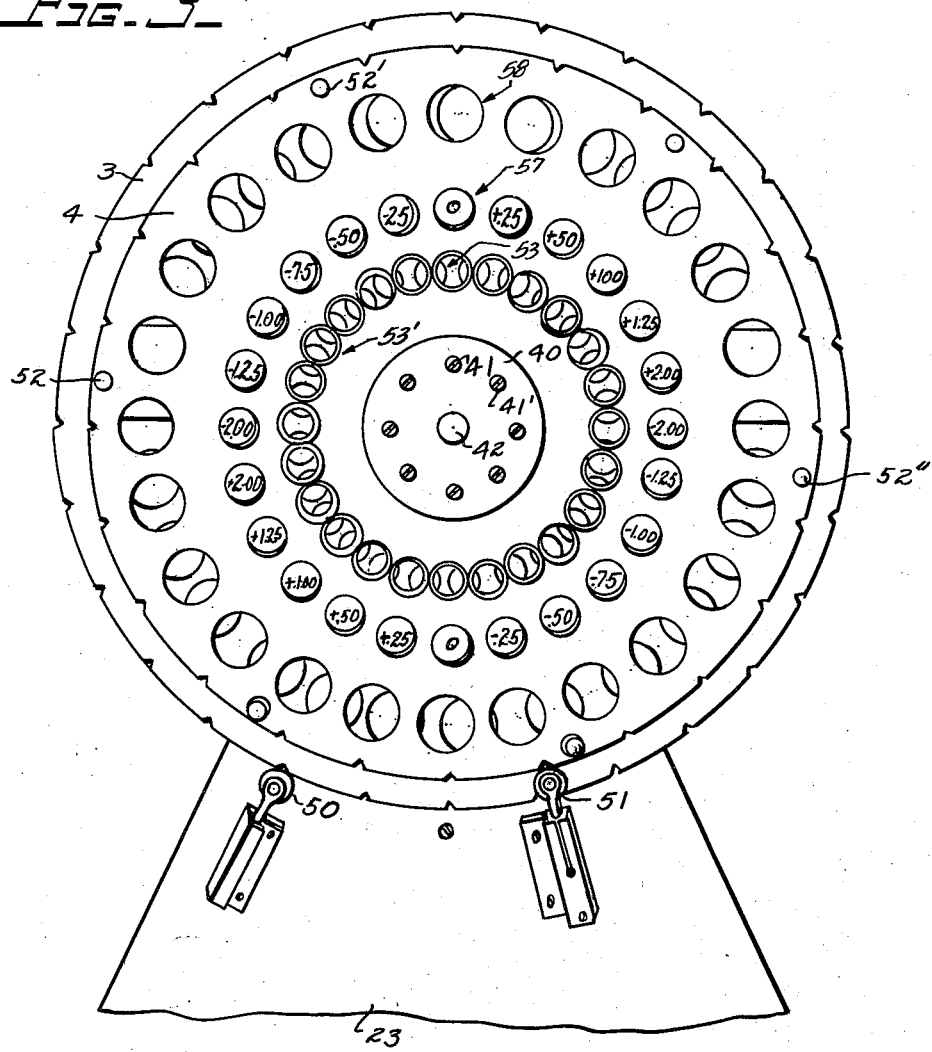
Fig. 3 is an enlarged elevational view of two discs remote from the working end of the instrument in Fig. 1.

The cross-arm 13 is mounted on the front ends of and is carried by a pair of rods 14 and 15 as shown in Fig. 2. The rods 14 and 15 slide through cushioning bushings 16 and 17 in collars 18 and 19. The opposite ends of each of the collars 18 and 19 are positioned in holes in rod mountings 20 and 21. The rod mountings 20 and 21 are positioned forwardly of and extend flat upwardly from a base 22. The base 22 also has a disc mounting 23 secured transversely thereof by an angle iron 24 and bolts 25, 25' etc. The disc mounting 23 is stabilized further by a triangular brace 26 apertured at 27 for a hand grip. Another hand grip 28 installed near the bottom of the furthermost mounting 20 is provided for the convenient handling of the device.

The rods 14 and 15 are equipped adjacent their opposite ends with upwardly extending shouldered pins 30, 31 and 32, 33 that project upwardly from collars 34, 35 and 36, 37 secured to the rods. The shouldered pins 30, 31 and 32, 33 enter registering holes in a guard cover 38 so that the guard cover may be removed from the device when desired.

The discs 3 and 4 are journalled for independent rotation in the rear mounting 23. The forward smaller disc 4 has a circular center plate 40 secured thereto by screws 41, 41', etc. A solid steel shaft 42 has its forward end secured by welding, a press fit or the like, to the center plate 40. The shaft 42 so provided for the small disc 4 is journalled for rotation in a hollow tubular shaft 43 that is flanged at its forward end. Screws 44, 44' etc. secure the larger disc 3 to the flanged forward end of the tubular shaft 43. A separation plate 45 is held in place by the shaft 42 between the discs 3 and 4. The tube shaft 43 is journalled in a larger tube 46 that is flanged at its forward end for retention in a close fitting aperture in the disc mounting 23 that illustratively may be of wood, as shown. A collar 47 and set screw 48 secure the tubular shaft 43 axially in its journalled relation with the larger tube 46.

The discs 3 and 4 are notched along their peripheral edges for the removable insertion in the notches of spring loaded dog wheels 50 and 51, respectively for maintaining the discs in desired hand adjusted positions. The smaller disc 4 is shown provided with a desired plurality of forwardly projecting pins 52, 52' etc. to facilitate its adjustment manually. The larger disc 3 is adjusted by an operator grasping its protruding edge. The disc mounting 23 is flared laterally at its upper extremity as shown in Fig. 6 to provide mountings for the commercially available schematic eyes 5 and 6 that are equipped with adjustable iris shutters. The schematic eyes are calibrated and are fixed at desired positions.

Both of the discs 3 and 4 have three circular rings of apertures which rings of apertures are coaxial with respect to each other, which apertures are aligned radially with respect to each other and which apertures may have lenses mounted therein or not, as desired and as needed. The outermost ring of apertures in the error disc 3 have error lenses mounted therein. The error lenses in the outermost ring of apertures in the error disc 3 are designated in Fig. 4 of the drawings by the reference numerals 54a, 54b, 54c, etc. The outermost ring of apertures in the correction disc 4 have correction lenses mounted therein inclusive of clear lenses or no lens at all, so that the error lenses in the ring 54 may be seen through the apertures in the ring 58 of the correction disc 4, which disc 4 is positioned between the observer and the error disc 3. The lenses in the outermost ring 58 of apertures in the correction disc 4 are identified in Fig. 5 of the drawing by the reference numerals 58a, 58b, 58c, etc. The discs 3 and 4 are both journalled on the same shaft 42. The error disc 3 may be rotated manually to position the lens 54a in front of the schematic eye 5. The correction disc 4 may be rotated manually to position the lens 58a in front of both the lens 54a and the schematic eye 5. Duplicates of the lenses 54a and 58a, in the same order, are then in front of the schematic eye 6. In this manner both the teacher and the student simultaneously see duplicate presentations. The inner rings of apertures bear labels identifying the presentation in the outermost circle of lenses or are open apertures transmitting light.

In each of the discs 3 and 4 a label may appear in an inner illuminated label aperture centered on a common radius of the disc with an outermost lens aperture of the same disc. These labels are inked on transparent wafers removably inserted in the label apertures of the same disc so that both the labels and the lenses correspond and can be changed when desired. The labeled transparent wafers may be read easily when they are moved into a position where they are illuminated by transmitted light.

The smaller disc 4 has an outermost ring 58 of apertures that contain lenses 58a, 58b, etc. which, when in registration with disc 3 lenses 54a, 54b, etc., respectively, neutralize the optical errors introduced before the schematic eyes by the lenses 54a, 54b, etc. in the outermost ring 54 of apertures in the larger disc 3. In the larger error disc 3, an innermost circle of apertures 53 contain transparent error identifying labels 53a, 53b, etc. shown in Figs. 4 and 4a, that are illuminated selectively from the rear by light 55. The innermost ring of apertures 53' in the forward disc 4 are open windows through which the labels in the apertures 53 in disc 3 may be read. Another light 56 illuminates from the rear and through an open window middle ring of apertures 57' in the disc 3, a middle ring of label bearing apertures 57 of the smaller error neutralizing disc 4. The smaller disc 4 ring of label bearing apertures 57 are designated in Fig. 5 by the reference numerals 57a, 57b, 57c, etc. The larger disc 3 ring of open window apertures 57' are designated in Fig. 4 by the reference numerals 57'a, 57'b, 57'c, etc.

The labels in the innermost ring 53 of the larger error introducing disc 3 identify optical errors introduced by lenses in corresponding outermost apertures in the disc 3. The error lenses are in pairs so that the same error appears simultaneously before both schematic eyes before which a given pair of lens is then positioned. The error lenses of the disc 3 are identified by labels appearing in the innermost ring of apertures 53 in Fig. 4 and enlarged in Fig. 4a. The labels of the smaller error correcting disc 4 identify lenses in the radially outermost ring of apertures 58 thereof that neutralize the optical errors introduced by the disc 3.

The lights 55 and 56 are essentially alike and hence the sectional view of the light assembly 56 in Fig. 8 will suffice for both. The light proper comprises a bulb 58 in a phenolic base 58' to which are conducted two leads from a power source to be described hereinafter. The light phenolic base 58' makes a press fit within a hollow cylinder 59 that is apertured at both ends. The light cylinder 59 terminates at its forward end in a radially outwardly extending flange that secures the position of the cylinder in the ring mounting 23 and in a radially inwardly extending flange that retains a Celluloid wafer or the like, also secured in place, if desired, by a circumferentially expansive spring on the side of the wafer remote from the inner flange of a cylinder 59 as shown. The wafers and the lenses in the apertures of the discs 3 and 4 are removably mounted therein in a manner similar to the mounting of the Celluloid wafer in the light housing cylinder 59.

A step-down transformer 60 is mounted on the base 22 by a bolt 61 between the pair of rod support mountings 20 and 21. The transformer 60 is provided with an on-off switch 62 and an input lead 63. In an illustrative model an electrical input of alternating current of 110 volts potential and 60 cycles was stepped down to three volts. This current supply energizes the lights 55 and 56 that illuminate the labels in the disc apertures and the lights within the two retinoscopes 1 and 2. Illustratively the 3 volts supplied by the transformer 60 may be carried from the transformer to one of the sliding rods 14 or 15 and from that rod through leads 64, 65 and 66 to the lights within the two retinoscopes from which return is accomplished through the cross arm 13 and the other rod back to the transformer 60. Insulating collars 67 and 67' are positioned between the rods 14 and 15 and the cross arm 13. Each retinoscope head bearing upper portion is secured at the tubular upper end of the hand grip base by a set screw 68 or 68'. Light from light bulbs, not shown, within the hollow upper portion or stem of each of the retinoscopes 1 and 2, in the type of retinoscopes shown, strikes a centrally apertured mirror 69, in Fig. 7, in the back of each retinoscope head and is reflected as a concentrated narrow beam through a pair of lens apertures in the discs 3 and 4 into its respective schematic eye 5 or 6. Each retinoscope is supported by an apertured flattened extension 13' at each opposite end of the cross arm 13. A compression spring 70 presses downwardly against the upper surface of the cross arm flattened extension 13' at each opposite end of the cross arm 13. The upper end of the spring 70 presses upwardly against a washer 71 beneath a cotter pin 72 that extends diametrically across the hollow cylindrical shaft of the retinoscope. Another larger pin 73 within a press fit sleeve 74 extends diametrically through the shaft portion 1' of the retinoscope below the flattened extension 13' of the cross arm 13. The pin 73 is journalled in the sleeve 74 between a pin shoulder 75 and a collar 76 that is secured on the left hand end of the pin 73 by a cotter pin 77. The journalled pin 73 continues a preferred distance from the retinoscope in an aperture eye 78 between a pair of apertured eyes of a yoke 10' at each opposite end of the rotary mechanical linkage 10. A bolt 79 in the pin eye 78 and the yoke eyes 10' journal the assembly together. The lower end of the retinoscope shaft 1' makes threaded engagement with the metal core of the retinoscope handle 11.

Each end of the lateral push-pull mechanical linkage 9 between the lower ends of the retinoscopes 1 and 2 ends in an eye 9' grooved internally to receive a circular retention spring 80 on the shaft of a bolt 81 that threads into the lower end of the metal core of the retinoscope handle 11. The bolt bears two separate shoulders, one to engage the spring 80 and another to engage the lower end of the core of the retinoscope handle 11.

As seen by the instructor and the student looking through the holes in the centers of the mirrors in the heads of the retinoscopes 1 and 2, the larger disc 3, nearer the schematic eyes 5 and 6 is the optical error disc and the smaller disc 4 positioned forward of the disc 3 is the optical error neutralizing disc.

Figure 4A:
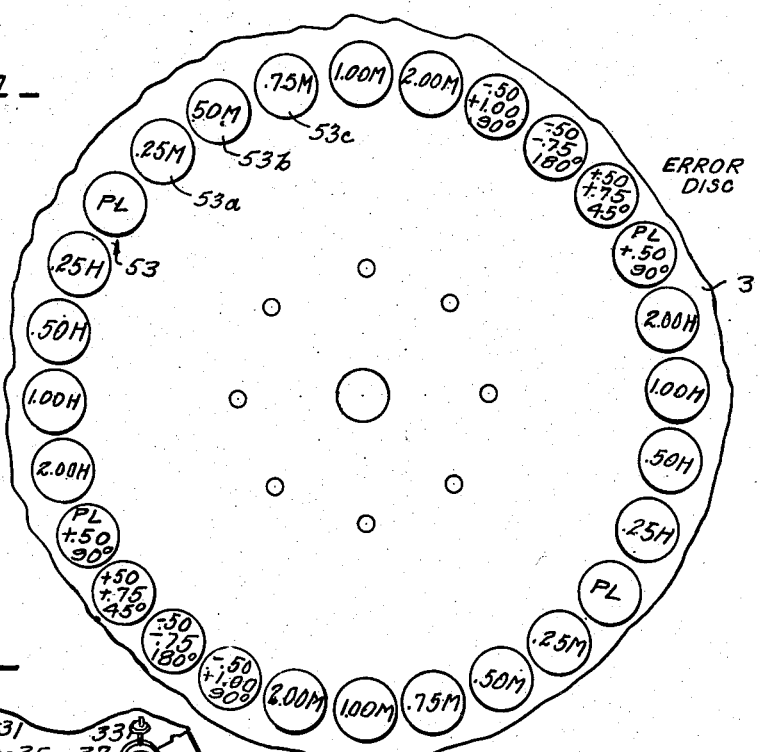
Fig. 4a is an enlargement of the indicia in the innermost ring of apertures of the error disc in Fig. 4.

The larger error disc 3 illustratively may have 28 error labels indicated in its innermost ring of apertures 53 such, for example, as those shown in Fig. 4a. The error labels in the error label ring 53 of Fig. 4a illustratively comprise 14 pairs of optical errors. Each label in ring 53 is in radial registration with an outermost aperture in ring 54 of Fig. 4 in which a lens is mounted introducing that error when positioned in front of a schematic eye. Each of these 14 pairs of optical errors in the lenses in the outermost ring 54 of apertures in the disc 3, may by rotation of the disc consecutively be brought into registration simultaneously as the same strength lenses before the pair of schematic eyes 5 and 6.

In a similar manner, the smaller error neutralizing disc 4 may have the 24 labels in Fig. 5 in its middle ring of apertures 57 that are in radial alignment with error neutralizing lenses mounted in its outermost ring 58 of apertures. The 24 outermost apertures in the ring 58 of the disc 4 have mounted therein lenses arranged in 12 matched pairs selectively neutralizing when in axial registration therewith 12 matched pairs of lenses in the ring 54 of the disc 3. The clockwise rotation of the smaller disc 4 from the position where the pair of apertures marked zero in the ring 57 are before the schematic eyes 5 and 6, will present successively in the ring 58 a plurality of matched pairs of identical powers of concave spherical lenses before the pair of schematic eyes 5 and 6. The counterclockwise rotation of the smaller disc 4 from the positions where the pair of apertures labeled zero are before the pair of schematic eyes 5 and 6, will present successively in the ring 58 a plurality of matched pairs of identical powers of convex spherical lenses before the pair of schematic eyes 5 and 6. The lenses in the outermost ring of apertures 58 in the smaller disc 4 neutralize in the pair of schematic eyes 5 and 6 the errors introduced by the error disc lenses in the ring 54 of the optical error introducing disc 3.

In the larger error disc 3, the 14 pairs of indications labeled in the innermost ring 53 of apertures therein, may be selected as desired by the instructor for use with the student. Illustratively, as shown in Figs. 4 and 4a the labels in the ring 53 are in optionally selected graduated degrees of optical error of the human eye, such as in degrees of myopia or near sightedness, hyperopia or far sightedness, various degrees of astigmatism, etc. Starting from a label PL, which indicates Plano or no optical error and hence no correction, and going in one direction are representative labels of graduated myopia, and in the opposite direction are representative labels of graduated hyperopia, with labels of astigmatism therebetween. The labels in the ring of apertures 53 in the larger error disc 3 for graduated degrees of myopia read .25M indicating .25 diopter of myopia, .50M, .75M, 1.00M and finally 2.00M which indicates 2 diopters of myopia. In the opposite direction from the label PL are the labels .25H indicating .25 diopter of hyperopia, .50H, 1.00H and 2.00H which indicates two diopters of hyperopia. Between the groups of apertures bearing the labels indicating representative degrees of myopia and hyperopia are apertures labeled to indicate desired illustrative types of astigmatism where the eye surfaces depart from spherical surfaces. The representative labels shown indicate simple astigmatism, compound myopic astigmatism, compound hyperopic astigmatism and mixed astigmatism. Illustratively the first label reads: —.50 +1.00 90°; the next label reads: —.50 —.75 180°, the third label reads: +.50 +.75 45°; and the 4th label reads: PL+.50 90°.

The instrument shown in the accompanying drawings has been submitted for the purposes of illustrating and describing an operative embodiment of the present invention. Changes and substitutions may be made in the kind of retinoscopes 1 and 2 used and in other parts of the device without departing from the concept and the scope of the present invention.

What I claim is:

1. An instrument for use in the instruction of retinoscope by an instructor for imparting to a student simultaneously both aural and visual coordinated information, comprising a pair of retinoscopes, means at one end of each retinoscope for causing a beam of light to be directed therefrom remote from a handle portion of each retinoscope, a push-pull mechanical linkage extending between and journalled on the lower ends of the handles of both retinoscopes, a rotary mechanical linkage between the pair of retinoscopes and together with the push-pull mechanical linkage slaving the two retinoscopes together for inclination and for rotation and for simultaneously causing both retinoscopes to be operated mechanically in the same sense and in the same degree, a schematic eye aligned in the beam of light of each retinoscope for its separate observation therefrom, and a plurality of pairs of duplicate lens means interchangeably insertable in the beams of light from the pair of retinoscopes for modifying the appearance of said schematic eyes.

2. The assembly described in claim 1 wherein the means insertable in the beam of light from each retinoscope is a pair of lenses of which one lens introduces a simulated optical error in the schematic eye and the other lens neutralizes the error in the schematic eye introduced by the first lens.

3. A dual retinoscope instrument for use in the study of retinoscopy by instructor and students comprising a first retinoscope for use by the instructor and provided with a handle, a second retinoscope for use by the student and provided with a handle, a push-pull mechanical linkage extending between and journalled on the lower ends of the handles of both retinoscopes, a rotary mechanical linkage between the pair of retinoscopes and together with the push-pull mechanical linkage slaving the two retinoscopes together for inclination and for rotation, a pair of schematic eyes separately observed from the first and second retinoscopes, a first lens system to be inserted between said retinoscopes and said schematic eyes whereby an error in the schematic eyes is introduced, and a second lens system by which the error so introduced by the first lens system is neutralized by the second lens system with both lens systems on a common axis.

4. A dual retinoscope, comprising on a common mount an instructor's retinoscope provided with a retinoscope operating handle, a student's retinoscope slaved to said instructor's retinoscope and operated by operation of the handle of the instructor's retinoscope, a push-pull mechanical linkage extending between and journalled on the lower end of the retinoscope handles, a rotary mechanical linkage between the pair of retinoscopes and together with the push-pull mechanical linkage slaving the two retinoscopes together for inclination and for rotation, a pair of schematic eyes separately observable from the instructor's retinoscope and from the student's retinoscope, means for adjusting the distance between said retinoscopes and said schematic eyes, an error introducing lens insertable between said instructor's retinoscope and said instructor's schematic eye and duplicated by a second error introducing lens insertable between said student's retinoscope and said student's schematic eye, and a first error neutralizing lens insertable between said instructor's retinoscope and said instructor's error introducing lens for neutralizing the error so introduced and duplicated by a second error neutralizing lens insertable between said student's retinoscope and said student's error introducing lens whereby the instructor may cause to be imparted to the student the appearance of an optical error in the schematic eye viewed through the student's retinoscope and then the neutralizing of the optical error by the introduction of a corrective lens therefor.

5. A dual retinoscope instruction instrument for the use of an instructor and a student in both viewing simultaneously simulated imperfections in eye structures comprising a pair of retinoscopes provided with a handle for each and mounted to remain substantially parallel to each other and each characterized by a light source providing a light beam directed toward a mirror which reflects the beam in a direction which is substantially normal to the axis of the retinoscope, a push-pull mechanical linkage extending between and journalled on the lower ends of the handles of both retinoscopes, a rotary mechanical linkage between the pair of retinoscopes and together with the push-pull mechanical linkage slaving the two retinoscopes together for inclination and for rotation, a cross arm bearing one retinoscope of said pair of retinoscopes at each of its opposite ends with the retinoscopes journaled in the ends of the cross arm for at least the partial rotation of the retinoscopes with respect to the cross arm, a pair of cross arm supporting rods extending away from and substantially normal to the cross arm, rod mounting means supporting the retinoscopes through the rods and the cross arm with the rods and the cross arm adjustable with respect to the rod mounting means, a base supporting the rod mounting means, a disc mounting means supported by the base, a plurality of superposed lens carrying discs mounted for adjustable rotation about a common center on the disc mounting means with the discs matching a plurality of lenses in pairs at opposite ends of common diameters to present duplicate lenses before and separately intercepting the light beams from the two retinoscopes supported by the cross arm.

6. A dual retinoscope comprising a pair of retinoscope assemblies each provided with a handle and each assembly consisting of a light source within a hollow stem directing light energy toward a centrally apertured mirror which reflects the light energy as a concentrated narrow beam away from each of the retinoscope assemblies, a modified retinoscope handle into which each of the pair of retinoscope assembly hollow stems is secured, each retinoscope modified handle comprising a cylindrical shaft apertured diametrically, a retinoscope supporting and journalling pin rotatably positioned within the aperture in the retinoscope shaft, a rotary mechanical linkage of which the retinoscope supporting pin is a member, a cross-arm member of the rotary mechanical linkage and which cross arm member supports the pair of retinoscope assemblies at its opposite ends, a pair of rods secured at one of their ends in the cross arm member as a support therefor, rod mounting means supporting the pair of rods, a base supporting the rod mounting means and the pair of retinoscope assemblies through the pair of rods and the cross arm and the pins, and a push-pull mechanical linkage journalled on the lower ends of the handles of both retinoscopes in slaving the two retinoscopes together for the inclination and for rotation by operation of either handle portion of either retinoscope.

7. The dual retinoscope defined in the above claim 6, inclusive of the pin having an end projecting from the retinoscope shaft adequately for causing retinoscope shaft rotation upon the application of a turning force to the pin end by operation of the handle of either retinoscope.

8. The dual retinoscope defined in the above claim 6, inclusive of a bolt means projecting axially from the base of the retinoscope handle to provide a journal at each of the opposite ends of the push-pull mechanical linkage and on the operation of either retinoscope handle for causing retinoscope shaft lateral inclination simultaneously of both retinoscopes upon the application of a laterally directed force to the bolt means carried by the base of each retinoscope handle.

9. A retinoscope instruction instrument for imparting visual information simultaneously coordinated with aural information between an instructor and a student, comprising an instructor operated first retinoscope provided with a substantially cylindrical handle remote from a centrally apertured mirror directing a light beam away from the upper end of the first retinoscope, a student operated second retinoscope equipped with a cylindrical handle remote from a centrally apertured mirror directing a light beam away from the upper end of the second retinoscope, a push-pull mechanical linkage extending between the lower ends of both of the retinoscope handles and journalled thereon, and a rotary mechanical linkage extending between the pair of retinoscopes and together with the push-pull mechanical linkage slaving the retinoscopes together for inclination and for rotation.

References Cited in the file of this patent

UNITED STATES PATENTS

| Number | Name | Date |
| --- | --- | --- |
| 858,979 | Hammar | July 2, 1907 |
| 1,048,570 | Murphy | Dec. 31, 1912 |
| 1,158,187 | Zeng | Oct. 26, 1915 |
| 1,377,740 | Troncoso | May 10, 1921 |
| 1,445,028 | Morse | Feb. 13, 1923 |
| 1,596,717 | Clement | Aug. 17, 1926 |
| 1,754,032 | McFadden | Apr. 8, 1930 |
| 1,774,832 | Keeler | Sept. 2, 1930 |
| 1,804,691 | Hunsicker | May 12, 1931 |
| 2,091,936 | Roberts | Aug. 31, 1937 |
| 2,139,850 | Ranoe | Dec. 13, 1938 |

FOREIGN PATENTS

| Number | Country | Date |
| --- | --- | --- |
| 318,487 | Great Britain | Apr. 3, 1930 |